United States Patent [19]

Morley

[11] 4,345,514
[45] Aug. 24, 1982

[54] CONTINUOUS HAMBURGER GRILL

[75] Inventor: Fred W. Morley, Indianapolis, Ind.

[73] Assignee: David W. Morley, Indianapolis, Ind.

[21] Appl. No.: 194,382

[22] Filed: Oct. 6, 1980

[51] Int. Cl.³ .............................................. B30B 37/06
[52] U.S. Cl. ...................................... 99/349; 99/353; 99/355; 99/423; 99/425
[58] Field of Search ................. 99/349, 423, 425, 353, 99/373, 386, 360, 339, 355; 425/374; 100/144, 151, 156

[56] References Cited

U.S. PATENT DOCUMENTS

| | | | |
|---|---|---|---|
| 1,471,727 | 10/1923 | Gomez | 99/423 X |
| 1,621,234 | 3/1927 | Carpenter | 99/373 X |
| 1,881,126 | 10/1932 | Parr | 99/353 |
| 2,907,267 | 10/1959 | Lindsey | 99/339 |
| 3,012,496 | 12/1961 | Kelley | 99/423 |
| 3,058,434 | 10/1962 | De Jersey | 99/360 |
| 3,291,036 | 12/1966 | Perl | 99/373 X |
| 3,379,141 | 4/1968 | Groth | 99/349 X |
| 3,380,377 | 4/1968 | Alexander | 99/349 X |
| 3,457,853 | 7/1969 | Morley | 99/349 |
| 3,693,452 | 9/1972 | McGinley | 99/349 X |
| 4,241,648 | 12/1980 | Longenecker | 100/156 X |

Primary Examiner—Billy J. Wilhite
Attorney, Agent, or Firm—Jenkins, Coffey, Hyland, Badger & Conard

[57] ABSTRACT

A continuous rotary hamburger grill has means for forming unshaped balls or scoops or other quantums of ground meat into hamburger patties as it presses them into cooking relation with the rotating grill plate. The meat quantums deposited on the grill plate at a loading station are carried thereby beneath an adjustably mounted, sloping pressure plate which presses them into sticking relation with the grill plate and compresses them into patties of uniform thickness. A flexible liner of non-stick material, e.g., Teflon, underlies the pressure plate so that the patties slide thereunder. To reduce moisture loss and improve cooking, a flexible cover sheet of non-stick material rides on the top of the patties as they travel through a cooking zone. The free edge of the pressure paper plate liner underlies the adjacent edge of the flexible cover sheet to provide means for feeding the patties beneath such cover sheet.

12 Claims, 5 Drawing Figures

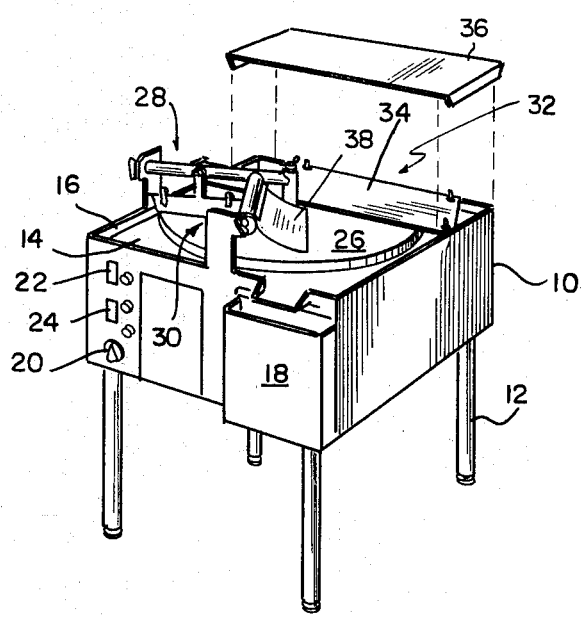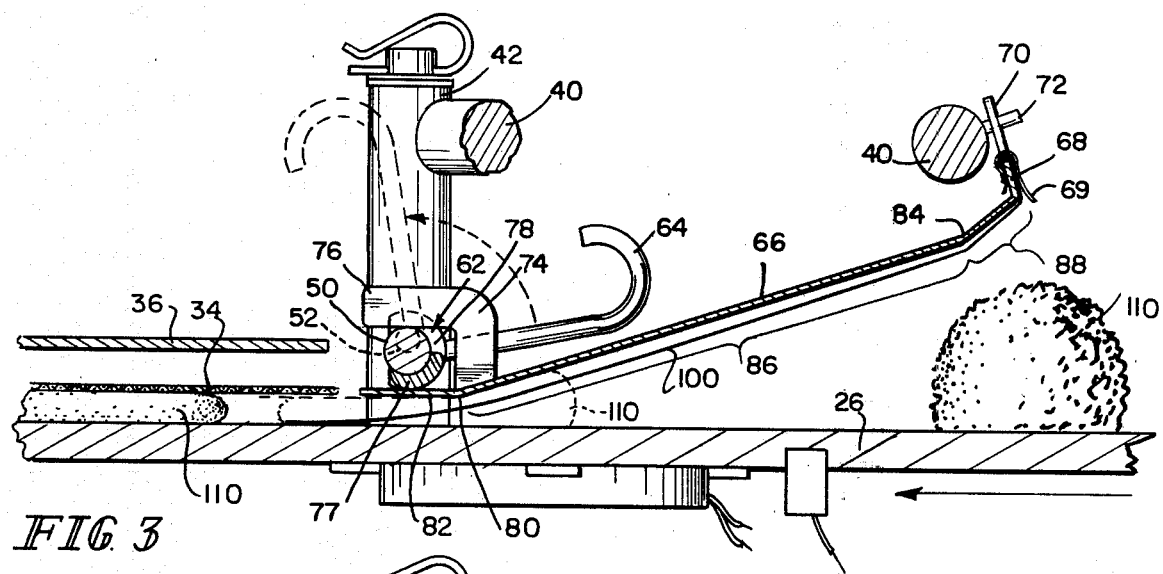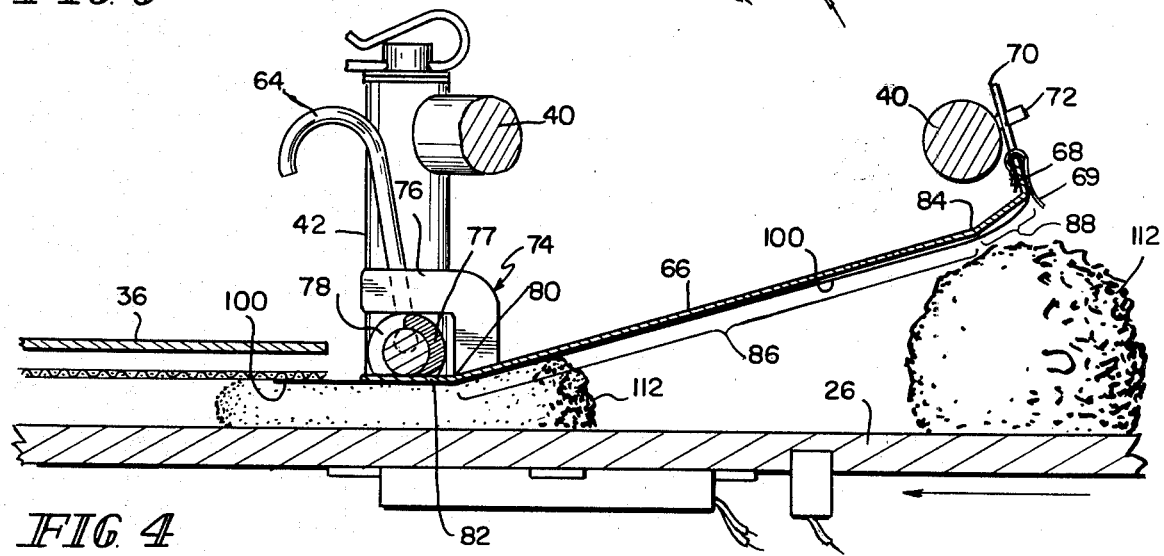

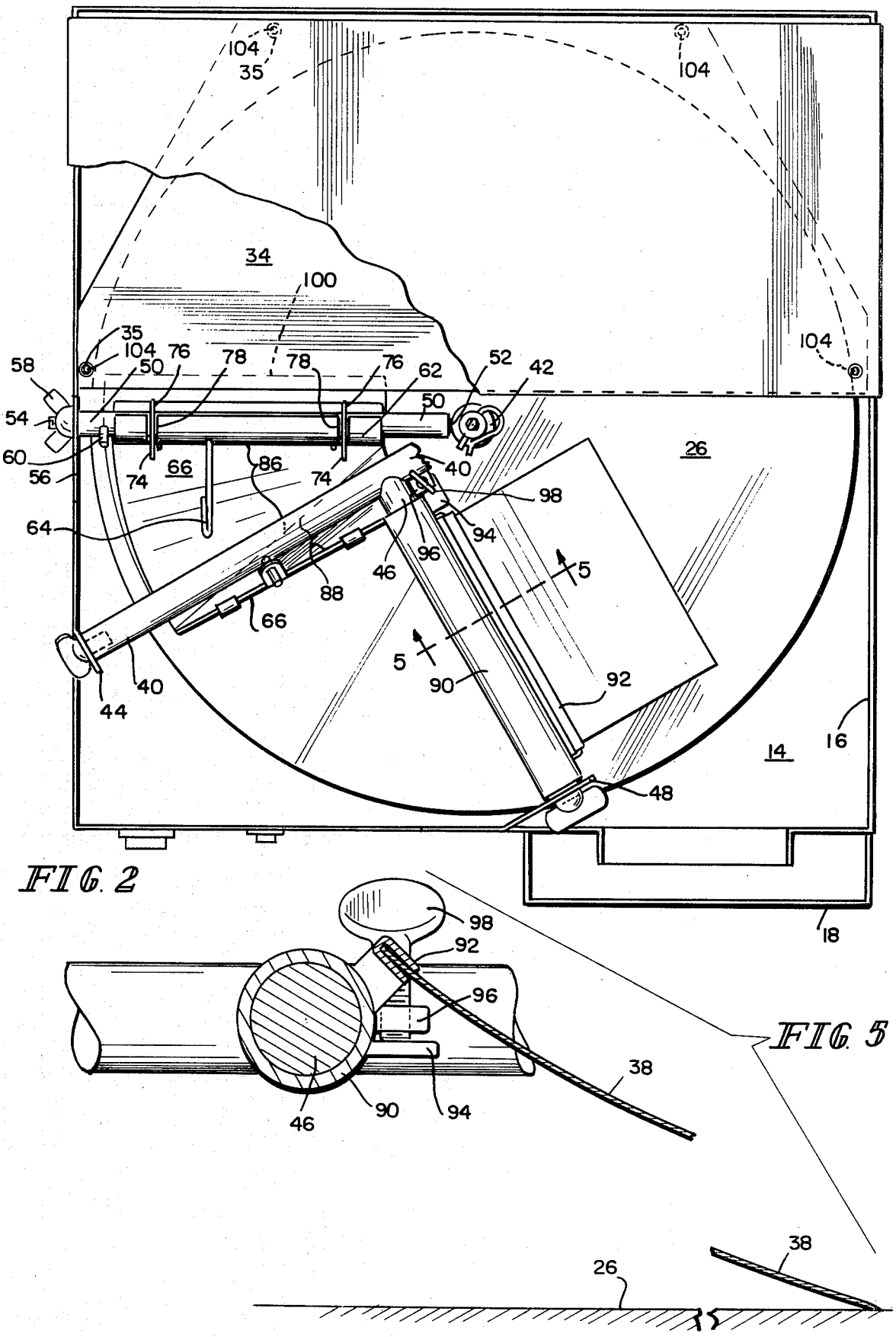

CONTINUOUS HAMBURGER GRILL

This invention relates to an improvement of a continuous hamburger grill of the type shown in my prior U.S. Pat. No. 3,457,853.

In the grill of that patent, pre-formed hamburger patties are deposited on a rotating or otherwise moving grill plate of a material, such as steel, to which they will stick during cooking, are carried thereby beneath a roller which reworks the meat to eliminate the tough body which the patties tend to acquire in storage, and to press the patties into sticking engagement with the cooking plate. The patties are then carried through a cooking zone which may be covered by an overlying shroud, and they then travel to a knife which cuts them from the cooking surface. It is the principal object of the present invention to provide an improvement which permits the hamburger meat to be loaded on the cooking surface in the form of unshaped quantums of ground meat, for example, in balls or in scoops such as are produced by scooping the meat from a bulk quantity with an ice cream dipper. It is a further object of the invention to further improve the cooking process, especially to prevent shrinkage and moisture loss during the cooking, and produce more uniform doneness throughout the patty.

In accordance with the invention, a continuously moving grill plate is adapted to receive meat quantums at a loading station. A sloping pressure plate is adjustably mounted over the grill plate so that the meat quantums are carried beneath such pressure plate as they are conveyed from the loading zone by the grill plate. The pressure plate is sloped to press each meat quantum against and into sticking engagement with the grill plate and to compress it between itself and such grill plate into a patty of substantially uniform thickness. The pressure plate is provided with a non-stick liner covering its meat-engaging surface so that the meat will readily slide along the pressure plate as it is carried thereunder by its sticking engagement with the grill plate. The liner is preferably a flexible sheet of non-stick material, e.g., Teflon, releasably secured at one edge to a fixed support at the entrance to the pressure plate and extends loosely beneath the pressure plate and through the space between that plate and the grill plate. A flexible cover sheet is held in loosely overlying relation with the grill plate over the cooking zone and has one edge adjacent the discharge edge of the pressure plate, and the pressure plate liner extends under such edge of the cover sheet so as to feed patties from the pressure plate into underlying relation beneath the cover sheet as they leave the pressure plate. Means is also provided for adjusting the height of the pressure plate and for quickly shifting its height selectively between upper and lower positions for cooking two thicknesses of hamburger patties during the same continuous operation and without resetting the machine.

The invention has been found to significantly increase the efficiency and the rate which which hamburger patties can be cooked, and has been found especially advantageously not only in commerical fast-food operations, but especially in such applications as in school lunchrooms where it is necessary to produce large numbers of hamburgers in limited lunch periods. The invention has been applied to prototype installations rated at 900 and 1800 hamburgers per hour, respectively.

The accompanying drawings illustrate the invention and show a preferred embodiment exemplifying the best mode of carrying out the invention as presently perceived. In such drawings:

FIG. 1 is a perspective view of a continuous hamburger grill embodying the invention;

FIG. 2 is a plan view of the rotary grill shown in FIG. 1, with parts broken away, and with the protective cover or shroud removed;

FIG. 3 is a sectional view taken on the line 3—3 of FIG. 2, showing the pressure plate in section and in its low position;

FIG. 4 is a sectional view like FIG. 3, but showing the thickness selector cam in its high position; and FIG. 5 is a section taken on the line 5—5 of FIG. 2, showing an improved blade-mounting and adjusting mechanism.

The hamburger grill shown in FIG. 1 comprises a table-like housing 10 mounted on legs 12 and having a top surface 14 surrounded by an upstanding rim 16. An opening in such rim leads to a grease-collecting bucket 18. The front face of the housing 10 carries a speed control 20 controlling the rate of rotation of the rotary grill, and carries a motor switch 22 and a heat switch 24. A circular grill plate 26 is mounted for rotation above the top surface 14 of the housing 10, and is driven by mechanism analogous to that shown in my prior U.S. Pat. No. 3,457,853. The peripheral edge of the grill plate preferably carries a depending lip which overlaps an upstanding lip on the top plate 14 so that grease from the grill will be collected on the top surface 14 for delivery to the grease bucket, as in my prior patent.

A pressure plate mechanism 28 is mounted above the grill plate 26 in position to receive hamburger quantums deposited on the grill plate 26 at a loading station 30. From the pressure plate mechanism 28, the meat is carried through a cooking zone 32 covered by a loosely mounted flexible cover sheet 34 of non-stick material, and the cooking zone is also desirably covered by a protective metal shroud plate 36 which both protects and retains heat over the cooking zone.

At a discharge station beyond the cooking zone, a knife blade 38 is mounted in an adjustable blade holder which presses the sharpened edge of the blade into continuous contact with the cooking surface of the grill plate to cut therefrom the patties which have been cooked in sticking engagment with such grill plate and to continuously scrape the grill plate clean.

The pressure plate and blade-mounting mechanism shown in FIGS. 2-5 comprise a first pressure plate support in the form of a radial bar 40 removably mounted between a central post 42 and a bracket 44 beyond the periphery of the grill plate 26. Adjacent its inner end, the bar 40 is joined to and supports the inner end of a blade-mounting bar 46 removably supported at its free end by a bracket 48 adjacent the periphery of the grill plate. In a position spaced angularly from the bar 40, and at a lower level, closer to the surface of the grill plate 26, there is a second pressure plate support in the form of an eccentric bar 50 mounted by an eccentric pin 52 at its inner end in a socket in the post 42 and supported at its outer end by an eccentric pin 54 received in a bracket 56 and threaded at its outer end to receive a thumb nut 58. The eccentric bar 50 carries an adjusting pin 60 for rotating it to adjust the height of the discharge end of the pressure plate described below. The bar is locked in adjusted position by the nut 58. The eccentric bar 50 carries a cam sleeve 62 which is rotatable on such bar by a handle 64 between two positions for purposes of selectively changing the height of the pressure plate between high and low positions for forming hamburgers of different thicknesses.

A pressure plate 66 is hung from the fixed support bar 40 and the eccentric support bar 50. Such pressure plate is in the form of an arcuate segment formed to provide a downward sloping wall with an upstanding flange 68 at its entrance end. This is supported at its entrance end by a single upstanding bracket 70 fixed to the flange 68 and received over a pin 72 fixed on the support bar 40. Adjacent its exit end, the pressure plate carries means to embrace the cam sleeve 62. A pair of upstanding brackets 74 have upper horizontal arms 76 which overlie the eccentric bar 50 and in their lowered position lie against such bar in slots 78 in the cam sleeve 62, as shown in FIG. 3. In such position, a solid section 77 of the cam bar 62 lies between the bottom face of the eccentric bar 50 and the top face of the discharge edge of the pressure plate 66, so as to hold such edge downward to exert pressure on the hamburger patties passing beneath the plate.

The pressure plate 66 is formed so that its entrance edge is at approximately the same height above the grill plate 26 throughout its radial length, and likewise the discharge edge of the plate is held at a constant distance from the surface of such grill plate 26. To provide this configuration of the pressure plate 66, I have found it convenient to form one bend 80 on a radial line parallel with and spaced rearward from the discharge edge of the pressure plate 66 so as to provide a generally horizontal discharge lip 82, and to form a second bend along an angular line 84 to separate the plate into a central gently sloping segment 86 and a rearward, more steeply sloped segment 88. The segment 86 may slope at 18° and the segment 88 at 40°. As shown in FIG. 2, the gently sloping segment is wide at its outer periphery and narrows inwardly while the sleeply sloping segment 88 is substantially wider adjacent its inner periphery than at its outer periphery, so as to accommodate at the inner edge of the plate the same height difference between entrance and discharge edges as is present at the outer periphery of the plate.

The cam sleeve 62 is rotatable between its low position shown in FIG. 3 to a high position shown in FIG. 4. As the handle 64 on such cam sleeve is raised, the solid sections 77 of such cam sleeve move out from between the eccentric support bar 50 and the underlying pressure plate lip 82, and upward against the overlying horizontal legs 76 of the brackets 74 so as to lift such brackets and thereby raise the discharge lip of the pressure plate. In the high position, the solid sections 77 of the cam sleeve lie between the top face of the eccentric bar 50 and the overlying legs of the bracket 77. Each solid section 77 of the cam sleeve thus forms a cam segment which moves to upper and lower positions with respect to the eccentric support bar 50 to shift the discharge edge of the pressure plate between raised and lowered positions.

The blade-mounting mechanism shown in FIGS. 2 and 5 at the discharge station of the grill comprises a mounting sleeve 90 mounted on the blade-support bar 46 and carrying an elongated deep channel member 92 adapted to receive the rear edge of the blade 38. The blade is desirably a thin flexible blade which can be bent under stress to press its sharpened edge against the surface of the grill plate 26. For purposes of exerting and adjusting such stress, the blade carrier sleeve 90 carries a short pressure arm 94 adjacent its inner end, which arm underlies a stationary arm or boss 96 fixed to the support arms 40 and 46 at their junctions. A thumb screw 98 threaded through an opening in the fixed arm 96 exerts pressure on the arm 94 to rotate the blade carrier sleeve 90 in a direction to press the blade 38 against the grill plate 26, so as to cut from the grill plate the worked patties which have been cooked in sticking engagement with the grill plate.

Referring back to the pressure plate 66, such plate is provided with a non-stick liner 100, preferably in the form of a flexible sheet of non-stick material fastened as by clips 69 to the flange 68 at the entrance edge of the pressure plate 66, and extending loosely forward beneath the pressure plate 66 in the direction of rotation of the grill plate 26. Such liner is wide enough to underlie the whole radial width of the pressure plate 66, and desirably extends some distance beyond the discharge edge of that plate so as to feed the hamburger patties discharged from the pressure plate beneath the cover sheet 34 as they leave the pressure plate. Such cover sheet 34 is a flexible sheet of non-stick material, e.g., Teflon, which is loosely held in place over the cooking zone 32 of the grill plate 26. As shown in FIG. 2, the cover sheet is of trapezoidal form and has eyelets 35 adjacent its corners which are received over mounting pins 104 adjacent the side rim 16 of the top surface of the grill housing 10. The cover sheet is loosely supported by such pins so that it can ride on the surface of the grill plate or on the surface of hamburger patties carried beneath it by that plate.

Operation of the grill is as follows. The rotary grill plate 26 is heated by heaters and rotated in a horizontal plane by a driving motor, as in my prior patent. Balls or scoops 110, 112 or other roughly measured quantums of ground meat are placed on the rotating grill plate 26 at the loading zone 30, and each is carried against and under the pressure plate 66 by that grill plate. The scoops of meat engage the flexible liner 100, and slide along that liner as they are carried beneath the pressure plate 66, which presses them into sticking engagement with the grill plate and compresses them to a thickness determined by the height setting and selective position of the discharge end of the pressure plate. Such setting is previously adjusted by rotation of the eccentric bar 50 with the handle 60 and by locking such bar in adjusted position by tightening the wing nut 58. At any particular setting, the pressure plate may be selectively moved between a low position shown in FIG. 3 for shaping small scoops 110 and producing thin patties and a high position shown in FIG. 4 for shaping large scoops 112 and producing thicker patties, by shifting the handle 64 between the positions shown and thereby operating the cam sleeve 62. As the patty leaves the pressure plate 66, it will have been pressed into tight contact with the surface of the grill plate 26, which surface is desirably made of a material such as steel to which the hamburger sticks during cooking. The liner 100 of the pressure plate extends beyond the lip 82 at the discharge end of the pressure plate and under the adjacent edge of the cover sheet 34, so that the patties are fed beneath the edge of that cover sheet and travel thereunder through the cooking zone. During such travel through the cooking zone, the cover sheet 34 rides on the top surface of the patties to retain moisture and heat so that while they are nicely browned on the bottom surface, they are moist and of desirable doneness throughout their thickness. This allows the hamburgers to be somewhat thicker than was desirable with the continuous grill of my prior U.S. Pat. No. 3,457,853. This also aids in allowing hamburgers of different thicknesses to be intermingled in a continuous process with the grill plate rotating at a constant speed.

As the cooked patties emerge from beneath the cover sheet 34 at the end of the cooking zone, they are carried against the blade 38 with its sharp edge held tightly pressed against the surface of the grill plate at the discharge station, and the cooked patties are cut free from the cooking surface of the grill plate by the plate 38 and ride up onto the top surface of the blade, from where they are removed. If desired, the once-cooked patties removed from the plate can be turned over and again deposited on the grill plate 26 in the loading zone 30 so as to be carried by that plate through the cooking zone a second time to produce a nicely browned surface on the other side of the patty. Some operators have found it desirable to drive the grill plate at a higher rotating speed so that the initial cooking which occurs on the first pass is not complete and to routinely turn the partly cooked patties over onto the grill plate for a second pass to complete the cooking.

The continuous hamburger grill will produce uniformly cooked hamburgers at a high rate. In a small prototype unit having a grill plate of twenty-four inch diameter, such rate may be up to 900 hamburgers per hour or one every three or four seconds, while on a larger machine having a twenty-eight inch diameter grill plate, the rate can be approximately twice that amount. In either case, it is not necessary to load the grill with pre-formed patties, and it has been found especially convenient to use an ice cream dipper to scoop approximately uniform quantities from bulk ground meat and deposit the resulting balls from the ice cream dipper directly onto the grill plate in the loading zone 30. Pre-formed patties may also be used, and will be reworked by the pressure plate as was done by the roller in my prior patent.

In a commercial operation where orders for different sized patties may be received in intermingled order, the grill may be operated for a time with the pressure plate in its lowered position as shown in FIG. 3 to receive small scoops 110 and produce thin patties, the feeding of small scoops can then be momentarily interrupted until the last one has passed beneath the pressure plate 66, and the pressure plate can then be shifted to raised position and the desired number of large scoops 112 of meat can then be loaded on the grill plate in the loading zone. The pressure plate can thus be shifted back and forth between raised and lowered positions substantially without interruption of a continuous production process.

What is claimed is:

1. A continuous grill for hamburgers or the like, having means for forming unshaped balls or scoops or like quantums of ground meat into patties, comprising
   a continuous moving, heated grill plate adapted to receive the meat quantums at a loading station and having a surface to which the meat will stick when pressed thereagainst,
   a sloping pressure plate in a fixed position above said grill plate, beneath which the quantums pass as they are conveyed from the loading zone by the grill plate,
   and a non-stick liner covering the meat-engaging surface of the pressure plate along which the meat will slide as it is carried thereunder by sticking engagement with the grill plate,
   said pressure plate being sloped and positioned relative to the grill so as to press the meat quantums into sticking engagement with the grill plate and to compress them between itself and the grill plate into patties of substantially uniform thickness.

2. A grill as in claim 1 in which the grill plate has a cooking surface of a material to which ground meat will stick during cooking, and knife means at a discharge station for cutting cooked patties from the cooking surface.

3. A grill as in claim 1 in which the pressure plate is unheated and the liner is a flexible sheet secured adjacent the entrance end of the pressure plate and extending through the space between the pressure plate and the grill plate.

4. A grill as in claim 1 in which said grill plate is a rotary disk, said pressure plate is an arcuate segment having angularly spaced, radially extending entrance and discharge edges positioned in substantially parallel spaced relation with the surface of said disk.

5. A grill as in claim 4 in which said pressure plate has a flat discharge lip, an adjoining inwardly narrowing segment sloping at a low angle, and an adjoining outwardly narrowing segment sloping at a steeper angle to the entrance end of the pressure plate.

6. A grill as in claim 4 with the addition of means for selectively shifting the discharge end of the pressure plate between positions at different elevations above the grill plate for producing patties of different thicknesses.

7. A grill as in claim 4, further comprising a support for supporting the entrance end of the pressure plate, a support bar for supporting the discharge end of the pressure plate, cam means removable with respect to said support bar and means connecting such discharge end for movement by said cam between at least two positions at different elevations from said grill plate for forming patties of different thicknesses.

8. A continuous grill for hamburgers or the like, having means for forming unshaped balls or scoops or like quantums of ground meat into patties, comprising
   a continuously moving grill plate adapted to receive the meat quantums at a loading station,
   a sloping pressure plate beneath which the quantums pass as they are conveyed from the loading zone by the grill plate,
   and a non-stick liner covering the meat-engaging surface of the pressure plate along which the meat will slide as it is carried thereunder by sticking engagement with the grill plate,
   said pressure plate being sloped and positioned relative to the grill so as to press the meat quantums into sticking engagement with the grill plate and to compress them between itself and the grill plate into patties of substantially uniform thickness, and
   a flexible cover sheet of non-stick material held in loosely overlying relation with the grill plate over a cooking zone to which the patties are carried from the pressure plate, so as to ride on the surfaces of such patties in the cooking zone, and means at the discharge end of the pressure plate for feeding the patties beneath the adjacent edge of the flexible sheet.

9. A grill as in claim 8, in which the pressure plate liner is a flexible sheet secured adjacent the entrance end of the pressure plate and extending through the space between the pressure plate and the grill plate, and said pressure plate liner extends beyond the pressure plate into underlapping relation with the flexible cover sheet so as to provide means for feeding the patties therebeneath.

10. A continuous grill for hamburgers or the like, having means for forming unshaped balls or scoops or like quantums of ground meat into patties, comprising a continuously moving grill plate adapted to receive the meat quantums at a loading station, a sloping pressure plate in a fixed position above the grill plate, beneath which the quantums pass as they are conveyed from the loading zone by the grill plate, and a non-stick liner covering the meat-engaging surface of the pressure plate along which the meat will slide as it is carried thereunder by sticking engagement with the grill plate, said pressure plate being sloped to press a meat quantum into sticking engagement with the grill plate and to compress it between itself and the grill plate into a pattie of substantially uniform thickness, and further comprising means for pivotally mounting the entrance end of the pressure plate at a fixed elevation and means for selectively holding the discharge end of such plate at different elevations from the grill plate to produce patties of different thicknesses.

11. A continuous grill for hamburgers or the like, having means for forming unshaped balls or scoops or like quantums of ground meat into patties, comprising a continuously moving grill plate in the form of a rotary disk adapted to receive the meat quantums at a loading station, a sloping pressure plate beneath which the quantums pass as they are conveyed from the loading zone by the grill plate, and a non-stick liner covering the meat-engaging surface of the pressure plate along which the meat will slide as it is carried thereunder by sticking engagement with the grill plate, said pressure plate being sloped to press a meat quantum into sticking engagement with the grill plate and to compress it between itself and the grill plate into a pattie of substantially uniform thickness, and further comprising a support bar extending across a portion of the grill plate adjacent a loading zone, means to support the entrance end of the pressure plate from said bar in elevated position above the grill plate, a second support bar extending across a portion of the grill plate and spaced from said first bar, a cam sleeve rotatable on said second support bar and having cam means thereon, means on the pressure plate embracing said cam means, said cam sleeve being rotatable within said embracing means to fixedly locate the discharge end of the pressure plate at different elevations above said grill plate for forming patties of different thicknesses.

12. A continuous grill for hamburgers or the like, having means for forming unshaped balls or scoops or like quantums of ground meat into patties, comprising a continuously moving grill plate in the form of a rotary disk adapted to receive the meat quantums at a loading station, a sloping pressure plate beneath which the quantums pass as they are conveyed from the loading zone by the grill plate, and a non-stick liner covering the meat-engaging surface of the pressure plate along which the meat will slide as it is carried thereunder by sticking engagement with the grill plate, said pressure plate being sloped to press a meat quantum into sticking engagement with the grill plate and to compress it between itself and the grill plate into a pattie of substantially uniform thickness, and further comprising a central post on the axis of said rotary grill, a pressure plate support bar extending from said post to an outlying support member, a blade support bar joined to the plate support bar adjacent its inner end and extending therefrom to an outlying support member, a blade support rotatable on said blade support bar, and having a pressure lever at its inner end, a boss fixed to said bars at the junction thereof and a blade-adjusting screw in said boss and bearing against said pressure lever.

* * * * *